(12) United States Patent
Vollmer

(10) Patent No.: US 9,633,062 B1
(45) Date of Patent: Apr. 25, 2017

(54) DOCUMENT FINGERPRINTS AND TEMPLATES

(71) Applicant: Amazon Technologies, Inc., Reno, NV (US)

(72) Inventor: Adam Roy Vollmer, Raritan, NJ (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 353 days.

(21) Appl. No.: 13/872,443

(22) Filed: Apr. 29, 2013

(51) Int. Cl.
*G06F 17/30* (2006.01)

(52) U.S. Cl.
CPC ............................. *G06F 17/30371* (2013.01)

(58) Field of Classification Search
None
See application file for complete search history.

(56) References Cited

U.S. PATENT DOCUMENTS

| 2004/0024739 | A1* | 2/2004 | Copperman et al. ............. 707/1 |
| 2005/0283492 | A1* | 12/2005 | Schmitt ............. G06F 17/30371 |
| 2008/0177799 | A1* | 7/2008 | Wilson ............................ 707/200 |
| 2012/0072859 | A1* | 3/2012 | Wang ................ G06K 9/00442 715/764 |
| 2014/0032513 | A1* | 1/2014 | Gaither ............... G06F 17/2211 707/698 |

\* cited by examiner

*Primary Examiner* — Anh Tai Tran
(74) *Attorney, Agent, or Firm* — Thomas | Horstemeyer LLP; Michael J. D'Aurelio; Jason M. Perilla

(57) ABSTRACT

Aspects related to fingerprints and templates of documents are described. In one embodiment, the integrity of a document is checked by comparing a prior fingerprint of a document with a result of a fingerprint function applied to content of the document. When the fingerprint of the document is consistent with the result of the fingerprint function, a standard form related to the document is identified. In this context, a synopsis of the standard document may be provided. In other embodiments, when the prior fingerprint of the document is inconsistent with the result of the fingerprint function, one or more paragraphs of the document may be checked for consistency by comparing prior fingerprints of the paragraphs with results of a fingerprint function applied to the paragraphs. Common meaning statements for one or more of the paragraphs may also be identified and provided as part of the synopsis of the document.

24 Claims, 8 Drawing Sheets

DOCUMENT FINGERPRINTS AND TEMPLATES

BACKGROUND

Many documents include several paragraphs and sections. Among certain types of documents, some paragraphs are often reused. For example, in legal documents, warranty, disclaimer, and other boilerplate paragraphs may be generally copied among and reused between similar documents. In some cases, paragraphs are not changed when reused between similar documents.

It is also noted that some documents are lengthy and include dense passages of terms and/or conditions that, for example, may be time consuming to parse and comprehend. Similarly, for lengthy documents, if only one paragraph is amended or modified, it may be difficult to quickly ascertain whether any changes were made and where the changes were made.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
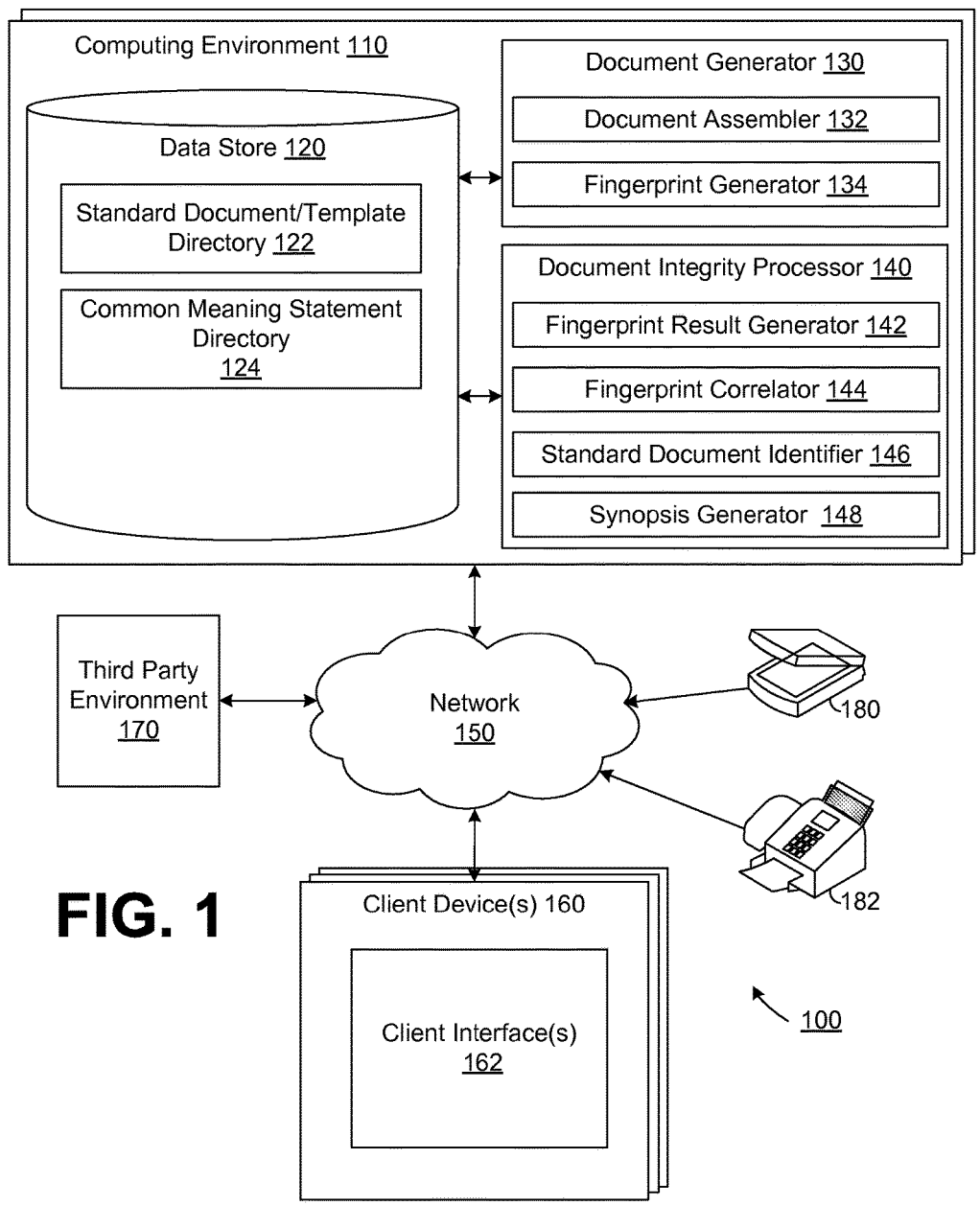
FIG. 1 illustrates a networked environment for document generation and integrity processing according to various embodiments of the present disclosure.

Many documents include several paragraphs and sections. Among certain types of documents, some paragraphs are often reused. For example, in legal documents, warranty, disclaimer, and other boilerplate paragraphs may be generally copied among and reused between similar documents. In many cases, the paragraphs are not changed when reused between similar documents.

Some legal documents include "legalese" that may be difficult for readers to parse and comprehend. Especially for people that are generally unfamiliar with standard legal documents, a considerable amount of time may be required to read and comprehend terms of a legal document. Additionally, if a standard paragraph of a document is amended or modified, it may be difficult to quickly ascertain whether any changes were made, especially if the paragraph contains a dense passage of terms and conditions.

In this context, aspects related to fingerprints (e.g., checksums, hash sums, etc.) and templates of documents are described. The generation of documents that incorporate fingerprints (i.e., fingerprint documents), as described herein, assists readers to identify whether changes were made to a document. Further, with reference to a database of standard form documents, plain term or common meaning statements associated with the standard form documents, and an iterative nested analysis of fingerprint documents, a synopsis of a document may be provided that identifies certain similarities and differences between the document and various standard form documents. The synopsis may present common meaning statements in connection with a document being analyzed, to assist readers that may find it difficult to comprehend dense paragraphs of terms and conditions, rights and responsibilities, and warranties and disclaimers. The synopsis may be provided, at least in part, without checking the integrity of a document. For example, one or more common meaning statements may be identified as part of a synopsis for a document using reference tags, without checking the integrity of the document. In this case, the synopsis may not provide details on whether the document was altered. Alternatively or additionally, a synopsis of a document may be provided even if only the integrity of certain sections or paragraphs of the document have been checked.

In various embodiments described herein, the integrity of a document is checked by comparing a fingerprint of the document with a content of the document. That is, the integrity of a document may be checked by comparing a prior fingerprint embedded within the document with a result of a fingerprint function applied to content of the document. When the fingerprint of the document is consistent with the result of the fingerprint function applied to the content of the document, a standard form related to the document may be identified based on a comparison of the fingerprint of the document to a database of standard documents. In this context, a synopsis of the standard document may be provided with reference to the standard form. In other embodiments, when the fingerprint of the document is inconsistent with the result of the fingerprint function, one or more sections or paragraphs of the document are checked for consistency by comparing prior fingerprints of the sections or paragraphs with results of a fingerprint function applied to content of the sections or paragraphs. Common meaning statements for one or more of the sections or paragraphs may also be identified and provided as part of the synopsis of the document.

In the following discussion, a general description of a system for document generation and integrity processing is provided, followed by a discussion of the operation of the same.

FIG. 1 illustrates a networked environment 100 for document generation and integrity processing according to various embodiments of the present disclosure. The networked environment 100 includes a computing environment 110, a network 150, a client device 160, a third party environment 170, and scanner and facsimile peripherals 180 and 182.

The computing environment 110 may be embodied as a computer, computing device, or computing system. In certain embodiments, the computing environment 110 may include one or more computing devices arranged, for example, in one or more server or computer banks. The computing device or devices may be located at a single installation site or distributed among different geographical locations. For example, the provider computing environment 110 may include a plurality of computing devices that together provide a hosted computing resource (also known as a "cloud" computing resource), a grid computing resource, and/or other distributed or hosted computing arrangement. In some cases, the computing environment 110 includes an elastic computing resource where an allotted capacity of processing, network, storage, or other computing-related resources varies over time.

The network 150 may include the Internet, intranets, extranets, wide area networks (WANs), local area networks (LANs), wired networks, wireless networks, other suitable networks, or combinations thereof. It is noted that the computing environment 110 may communicate with the client device 160 by various protocols such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other suitable protocols for communicating data over the network 150, without limitation. Similarly, the third party environment 170 and the scanner and facsimile peripherals 180 and 182 may communicate with the computing environment 110 and the client device 160 over the network 150 using any suitable network communications protocol.

The computing environment 110 may include various functional and/or logic (e.g., device or circuit) elements that may be executed or directed by the computing environment 110 according to various embodiments described in further detail below. As illustrated in the example embodiment of FIG. 1, the computing environment 110 includes a data store 120, a document generator 130, and a document integrity processor 140.

The data store 120 may store various content and data forms, data structures, and/or programs, for example, that are accessible to the computing environment 110, either locally or remotely. The data store 120 may be representative of a plurality of data stores 120 arranged in various configurations at one or multiple geographic locations, among embodiments, or may be representative of a web service from which data is retrieved through an application programming interface (API). In certain aspects, the data stored in the data store 120 is associated with the operation of the various applications and/or functional logic elements described below.

In one embodiment, the data store 120 includes a standard document/template directory 122 and a common meaning statement directory 124. The standard document/template directory 122 may store standard form documents and templates of standard form documents. A standard form document, as described herein, may be any document that is of known form, and may include one or more fingerprints associated with portions of the document, as described in further detail below. The common meaning statement directory 124 may store descriptions of various forms of standard documents, in common plain English, that are drafted to be easy to understand. In other words, with reference to one or more paragraphs of a document, such as warranty, disclaimer, or other boilerplate paragraphs, the common meaning statement directory 124 may store associated descriptions of the terms and term meanings of the paragraphs using language that is, generally, easier to parse and comprehend. It is noted that the example directories 122 and 124 are provided by way of example only, and it should be appreciated that the data store 120 may store additional or alternative types and/or directories of data.

According to features described herein, the document generator 130 of the computing environment 110 may generate fingerprint documents including one or more fingerprints attributed to the document itself (e.g., attributed to the document in its entirety). In various embodiments, the fingerprint documents may also include fingerprints attributed to one or more sections of the document and/or one or more paragraphs of the document. In this context, the document generator 130 may include a fingerprint generator 134 and a document assembler 132. As further described below, the document assembler 132 may generate a fingerprint document using one or more templates stored in the standard document/template directory 122. In certain embodiments, the templates include one or more term placeholders, and the document assembler 132 may insert names, dates, terms to be defined, or other text in place of the placeholders.

As part of the generation of a fingerprint document, the fingerprint generator 134 may generate fingerprints for a document generated by the document assembler 132 or provided to the computing environment 110 by way of the scanner or facsimile peripherals 180 and 182, for example, as further discussed below. A fingerprint may be any collection or string of binary or other digits that uniquely identifies a document, or one or more paragraphs or sections of a document. Non-limiting examples of a fingerprint may include a checksum, a hash sum or the like. The fingerprint generator 134 may generate fingerprints for one or more paragraphs or sections of the document. For example, using text from a paragraph or section of a document as input to a hash function, the text is mapped by the hash function to a smaller, unique, fingerprint of the text.

In one embodiment, the fingerprint generator 134 relies upon a Secure Hash Algorithm (SHA), such as the SHA-224, SHA-256, SHA-384, or SHA-512 hash functions, to generate fingerprints of portions of documents generated by the document assembler 132. The use of keyed or digital signature hash functions is also within the scope of the embodiment described herein. In this case, it may be possible to verify the integrity of a document and also verify that a certain individual or party created or modified the document. Generally, the hash function or technique relied upon by the fingerprint generator 134 transforms text within a document into a fixed length fingerprint value. It is noted that the scope of the embodiments described herein is not to be limited to any particular hash function or technique. Instead, any suitable hash function or technique that generates a unique datagram from an arbitrary block of data may be relied upon. As described herein, the fingerprint may be used to later verify the integrity of the original text of the document. After generating fingerprints of a document, the fingerprints may be incorporated, attached, or associated with the document for integrity checking and comparative purposes.

In other features of the computing environment 110, given a document for integrity processing, the document integrity processor 140 of the computing environment 110 may check the integrity of the document, identify standard form documents that may be related to the document, and generate a synopsis of the document. In this context, the document integrity processor 140 may include a fingerprint result generator 142, a fingerprint correlator 144, a standard document identifier 146, and a synopsis generator 148.

The fingerprint result generator 142 may generate a fingerprint by applying a fingerprint function to certain portions of a document. That is, the portions of the document are provided as an input to a fingerprint function, such as a hash function, to generate a result of the fingerprint function. In one embodiment, the fingerprint result generator 142 relies upon one or more fingerprint (e.g., hash, checksum, etc.) functions or techniques similar to those relied upon by the fingerprint generator 134. After the fingerprint result generator 142 generates a fingerprint of a portion of a document, the generated fingerprint or result may be compared by the fingerprint correlator 144 with a fingerprint attached or embedded within the document itself (e.g., a prior fingerprint of the document). As further described below, if the fingerprint or result of the fingerprint function generated by the fingerprint result generator 142 matches the prior fingerprint attached or embedded with the document, one or more portions of the document may be verified as being free from amendments or alterations. Alternatively, if the fingerprint or result of the fingerprint function generated by the fingerprint result generator 142 does not match the prior fingerprint attached or embedded with the document, one or more portions of the document may be identified by the fingerprint correlator 144 as being amended or altered.

The standard document identifier 146, given a document for integrity processing, may identify one or more standard form documents that are the same as or similar to the document for integrity processing. To identify a standard form document, the standard document identifier 146 may reference the standard document/template directory 122 with one or more fingerprints from a document received for integrity processing. In various embodiments, the standard document identifier 146 may reference the standard document/template directory 122 only for fingerprints associated with document content free from amendments or alterations, as determined by the fingerprint correlator 144.

The synopsis generator 148 may compile results returned by the fingerprint correlator 144 and/or the standard document identifier 146, to generate a synopsis of a document received for integrity processing. In various embodiments, the synopsis generator 148 may provide, for a document received for integrity processing, a synopsis that identifies certain similarities and differences between the document and various standard form documents. The synopsis may present common meaning statements in connection with a document received for integrity processing, for reference, to assist readers that may find it difficult to comprehend dense paragraphs of terms and conditions. Additionally, the synopsis may include an indication as to whether one or more paragraphs of a document received for integrity processing have been altered.

The client device 160 may be representative of one or more client devices operated by various users. The client device 160 may include any processor or computer based device or system, including those embodied in the form of a desktop or server computer, tablet computing device, handheld computing device, or electronic book reading device, among other example computing devices and systems. The client device 160 may execute applications including the client interface 162, which is representative of an example application that may execute on the client device 160.

Generally, the client interface 162 may offer an interface to services provided by the computing environment 110. For example, after transmitting a document for integrity processing from the client device 160 to the computing environment 110, a user of the client device 160 may rely upon the client interface 162 to review results of the processing performed by the computing environment 110. As further described below, for example, the user of the client device 160 may rely upon the client interface 162 to review a synopsis of a document transmitted to the computing environment 110 for integrity checking.

In various embodiments, the client device 160 may include functional and/or logic (e.g., device or circuit) elements similar to those of the computing environment 110. For example, the client device 160 may include elements similar to the document generator 130 and the document integrity processor 140. In such embodiments, the client device 160 performs fingerprint document generation and verification. Thus, it should be appreciated that fingerprint document generation and verification by the client device 160 is within the scope and spirit of the embodiments described herein.

The third party environment 170 may include any processor or computer based device or system operated by, or on behalf of, a third party. As further described below, various documents may be received by the client device 160 or the computing environment 110 from the third party environment 170. These documents may be analyzed by the document integrity processor 140, in various embodiments, to ascertain whether the documents have been altered or amended, for example, and to provide a synopsis of the documents for review.

To operate on or with hardcopy or physical documents, the networked environment 100 includes the scanner and facsimile peripherals 180 and 182. Thus, for example, to generate fingerprints for a physical-form document, a physical copy of the document may be scanned by the scanner peripheral 180 and electronically transmitted (e.g., via e-mail, facsimile, etc.) to the computing environment 110, the client device 160, and/or the third party environment 170. In various embodiments, a physical copy of the document may be converted into text or various glyphs by the scanner peripheral 180, before being electronically transmitted to the computing environment 110. In this context, the embodiments described herein may operate on electronic documents that include text, glyphs of text, or a combination of text and glyphs of text. After being transferred electronically, the computing environment 110 may further process an electronic copy of the original physical document. In this manner, the scanner and facsimile peripherals 180 and 182 assist with the electronic conversion of physical copies of documents for processing.

Next, a further description of the operation of the various components of the networked environment 100 is provided with reference to FIGS. 2-7.

Figure 2:
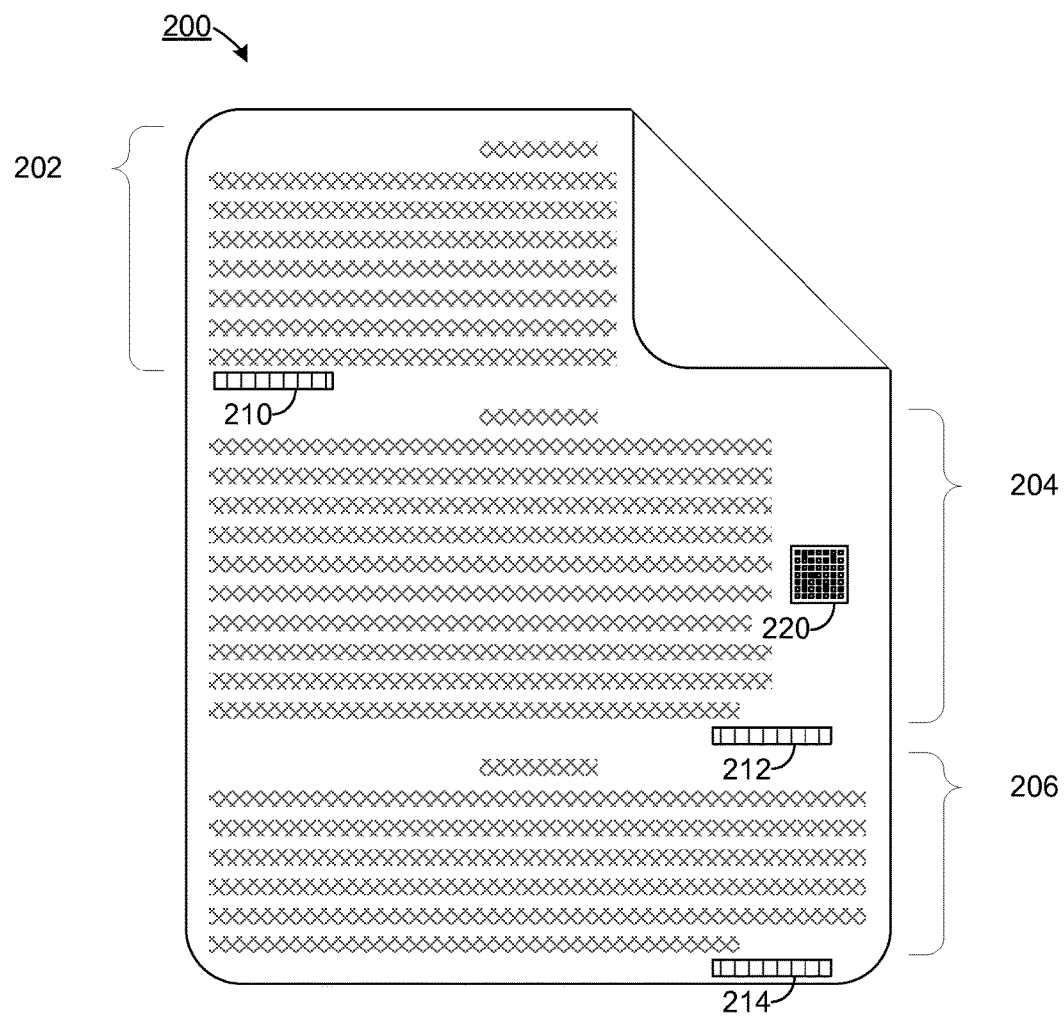
FIG. 2 illustrates a page of an example document generated by a computing environment of the networked environment of FIG. 1 according to various embodiments of the present disclosure.

FIG. 2 illustrates a page of an example document 200 generated by the computing environment 110 of the networked environment 100 of FIG. 1 according to various embodiments of the present disclosure. As illustrated, the example document 200 includes paragraphs 202, 204, and 206. The paragraph 202 is associated with a fingerprint 210. Similarly, the paragraph 204 is associated with a fingerprint 212, and the paragraph 206 is associated with a fingerprint 214. The document 200 further includes a reference tag 220, as a direct reference, associated with the paragraph 204.

In one embodiment, to generate the document 200, the text or content of the document 200 is provided to the document generator 130 of the computing environment 110 of FIG. 1. The text or content of the document 200 may be received by the client device 160 or the third party computing environment 170 from another device or devices. The client device 160 (via the client interface 160) or the third party computing environment 170 may then instruct the document generator 130 to assemble the document 200. Based on the text or content of the document 200, the fingerprint generator 134 may generate the fingerprints 210, 212, and 214, and the document assembler 132 may incorporate the fingerprints 210, 212, and 214 into the document 200 by attaching or embedding them into the document 200. It is noted that, in the embodiment of FIG. 2, the fingerprint 210 is representative of the paragraph 202, and was generated by the fingerprint generator 134 using the content of the paragraph 202. For example, the fingerprint 210 may be generated by the fingerprint generator 134 using the content of the paragraph 202 as input to a suitable fingerprint or hash function, as described herein. Particularly, the content of the paragraph 202 may include textual characters, any punctuation marks, and/or whitespace characters (e.g., spaces, tabs, etc.) of the paragraph 202. Based on the fingerprint or hash function used to generate the fingerprint 210, it should be appreciated that the fingerprint 210 is unique for the content of the paragraph 202, and cannot generally be reproduced by a variant of the content of the paragraph 202. Similarly, the fingerprints 212 and 214 cannot generally be reproduced by a variant of the contents of the paragraphs 204 and 206.

Each of the fingerprints 210, 212, and 214, which have been attached or embedded into the document 200, may be considered a "prior fingerprint," for purposes of integrity checking. Specifically, a prior fingerprint may serve as the basis for a comparison with a result of a fingerprint function applied to content of the document 200 at a later time. If the result of the fingerprint function is equivalent (or substantially equivalent) to the prior fingerprint, it may be considered that no alterations have occurred to the content of the document 200.

The reference tag 220 may include, in various embodiments, a direct reference to one or more standard forms stored in the standard document/template directory 122 or common meaning statements stored in the common meaning statement directory 124 of FIG. 1. It should be noted here that the standard forms stored in the standard document/template directory 122 may be referenced by either fingerprints, such as the 210, 212, and 214, or by reference tags. As compared to the fingerprints 210, 212, and 214, however, the reference tag 220 is generally not relied upon to verify the integrity of the content of the paragraphs 202, 204, or 206, but is instead used to easily reference a related form or plain English description of the paragraph 204.

When preparing the document 200, the document assembler 132 may generate the reference tag 220, attach or embed the reference tag 220 into the document 200, and store a copy of the paragraph 204 in the standard document/template directory 122 in association with the reference tag 220. In this manner, the reference tag 220 provides an additional reference to a reference copy of the content of the paragraph 204. Additionally, a reference copy of the paragraph 204 may be stored along with a plain English description of the paragraph, for future reference in connection with the reference tag 220. Use of the reference tag 220 by the synopsis generator 148 of FIG. 1 is further described below.

It is noted that, although the fingerprints 210, 212, and 214 are illustrated in FIG. 2 as being located adjacent or proximate to the paragraphs 202, 204, and 206, the fingerprints do not necessarily need to be attached or embedded in the document 200 at any particular location. Instead, the fingerprints 210, 212, and 214 may be attached or embedded within the document 200 at any suitable location, so long as each of the fingerprints is identified as being associated with its respective paragraph or content of the document 200.

Figure 3:
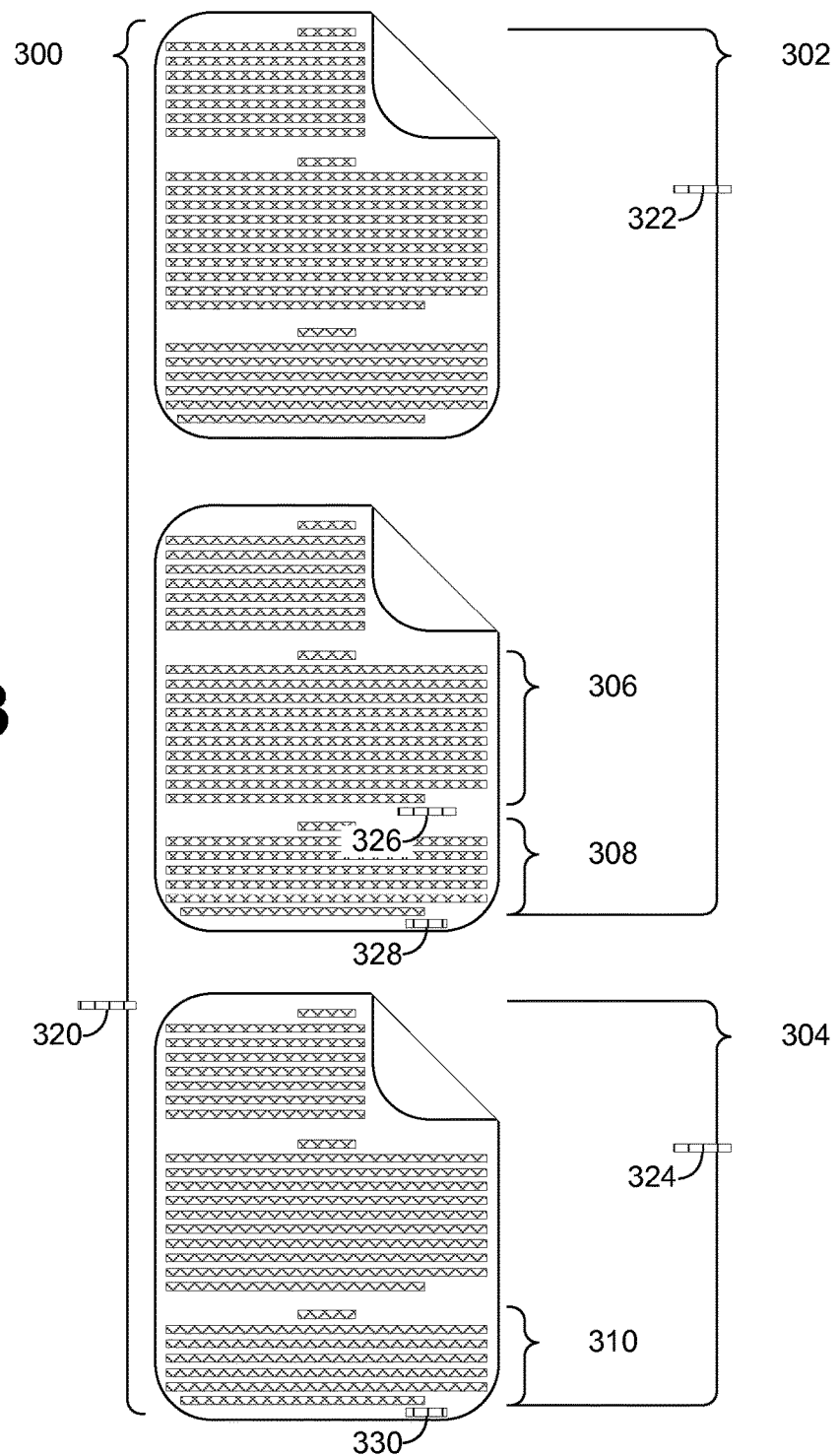
FIG. 3 illustrates an example document generated by the computing environment of the networked environment of FIG. 1 according to various embodiments of the present disclosure.

As a further extension of the document 200 of FIG. 2, FIG. 3 illustrates an example document 300 generated by the computing environment 110 of the networked environment 100 of FIG. 1 according to various embodiments of the present disclosure. As illustrated, the example document 300 includes sections 302 and 304. Further, the section 302 includes various paragraphs including paragraphs 306 and 308, among others. Similarly, the section 304 includes various paragraphs including paragraph 310, among others. The document 300, itself, is associated with a fingerprint 320. The sections of the document 302 and 304 are associated, respectively, with fingerprints 322 and 324. The paragraphs 306 and 308 of section 302 are associated, respectively, with fingerprints 326 and 328. Similarly, the paragraph 310 of the section 304 is associated with a fingerprint 330.

As compared to the document 200 of FIG. 2, the document 300 of FIG. 3 is organized in sections 302 and 304 and paragraphs 306, 308, and 310 of the sections 302 and 304. In this context, it is noted that fingerprints are generated for various organizational levels of the document 300, including for the document 300 itself, for the sections 302 and 304 of the document, and for the paragraphs 306, 308, and 310 of the sections of the document. As described in further detail below, fingerprinting at the organizational levels of sections and paragraphs may be relied upon to quickly determine whether and where changes were made in a document.

For example, referring to the document 300, by checking the fingerprint 320 against the content of the document 300, the fingerprint correlator 144 of FIG. 1 may quickly determine whether the document 300 has been altered or amended at least in part. That is, considering the fingerprint 320 as a prior fingerprint for the document 300, integrity of the document 300 may be verified by checking or comparing the fingerprint 320 with a result of a fingerprint function applied to the content of the document 300. If the document 300 has been altered or amended at some point in time after the fingerprint 320 was generated, the fingerprint correlator 144 will identify a difference between the fingerprint 320 and the result of the fingerprint function. Further, if a difference is identified, the fingerprint correlator 144 may compare results of a fingerprint function applied to the content of the sections 302 and 304 with the fingerprints 322 and 324. If necessary, the fingerprint correlator 144 may additionally compare results of a fingerprint function applied to the content of the paragraphs 306, 308, and 310 with the fingerprints 326, 328, and 330.

Figure 4:
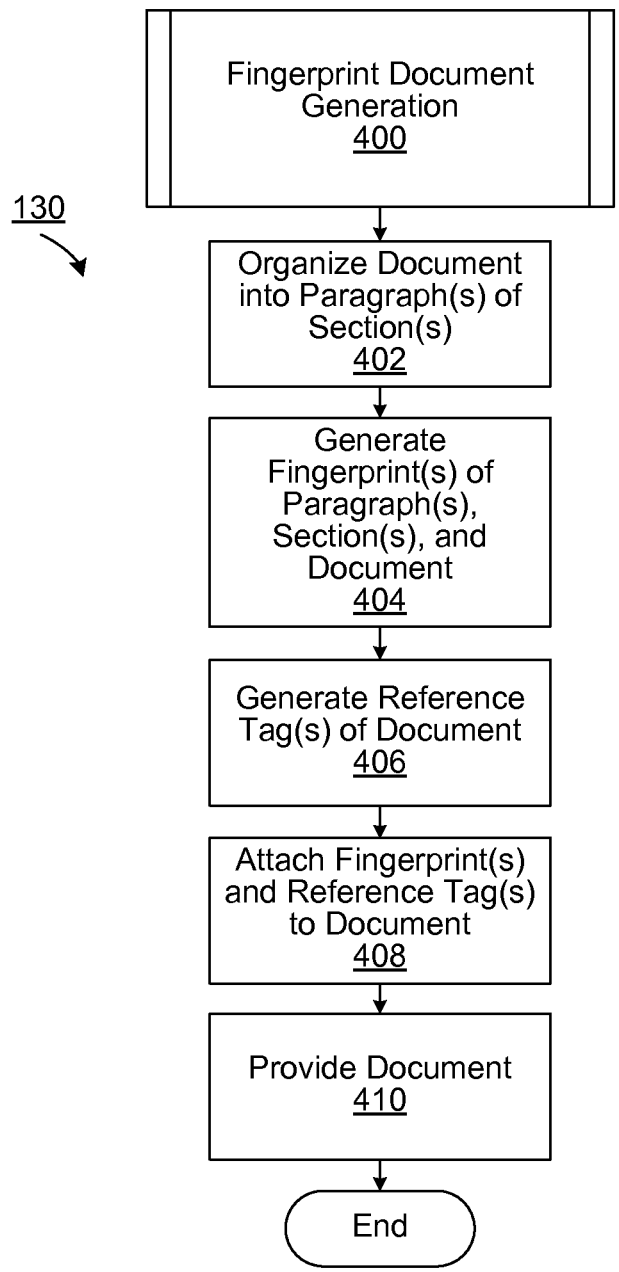
FIG. 4 illustrates a flow diagram of an example process of fingerprint document generation performed by a document generator of the computing environment of FIG. 1 according to various embodiments of the present disclosure.
Figure 5:
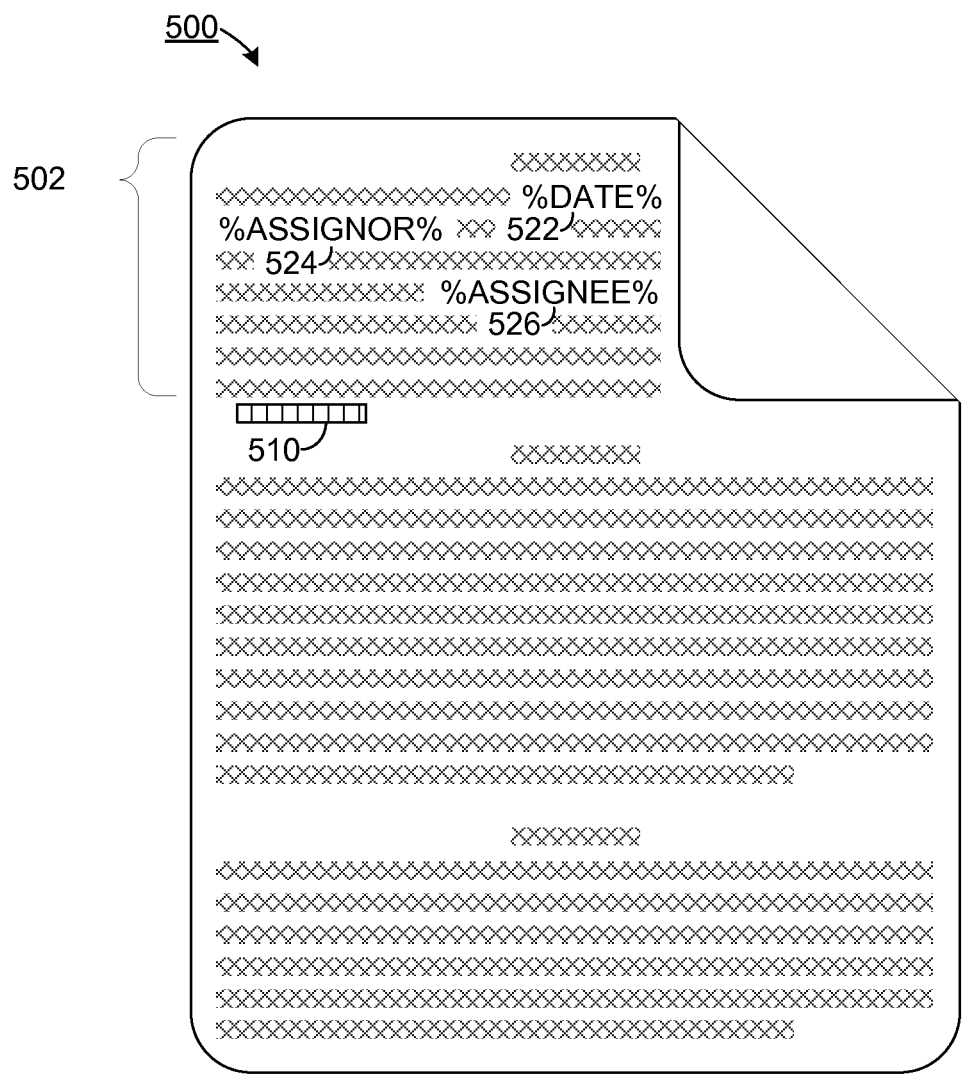
FIG. 5 illustrates a template page of an example document, including term placeholders, relied upon by the computing environment of FIG. 1 according to various embodiments of the present disclosure.
Figure 6:
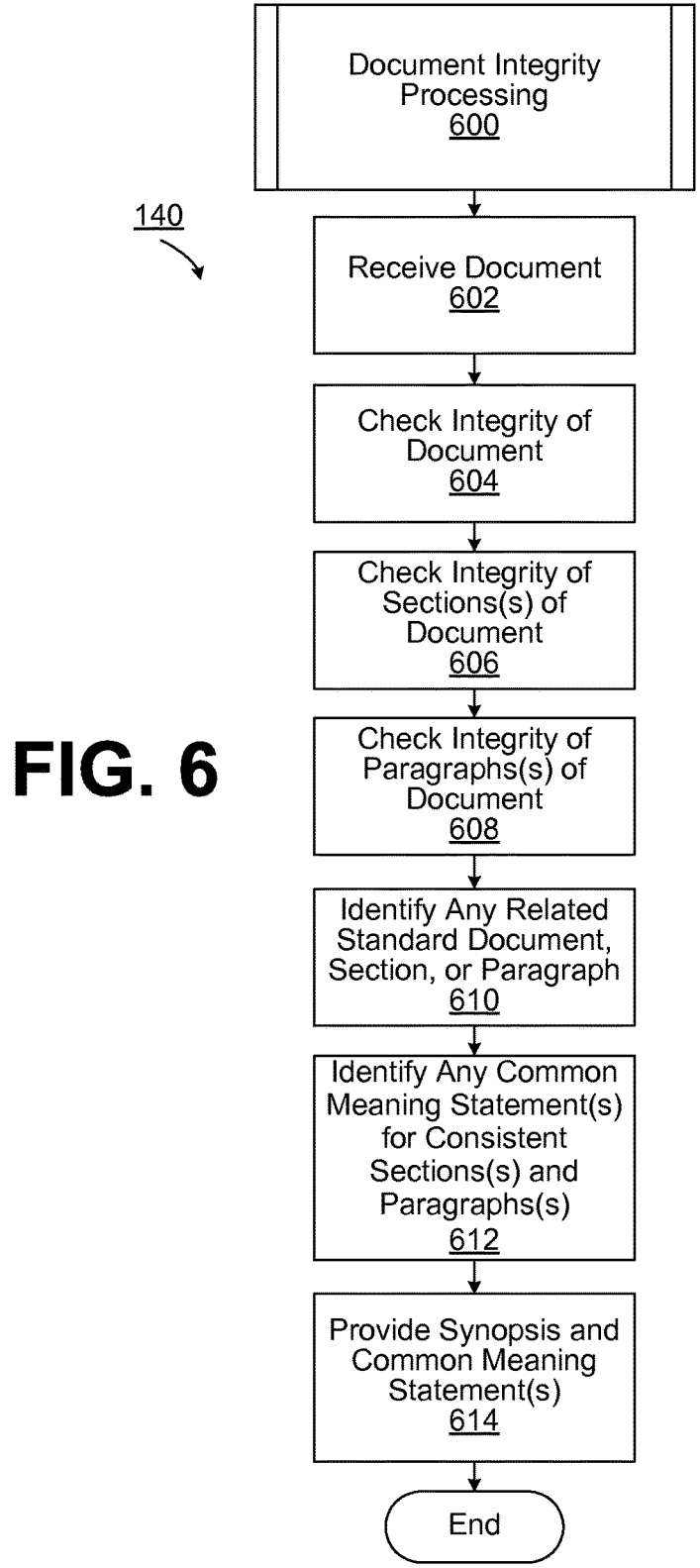
FIG. 6 illustrates a flow diagram of an example process of document integrity processing performed by a document integrity processor of the computing environment of FIG. 1 according to various embodiments of the present disclosure.

Referring next to FIGS. 4-7 below, it is noted that the flow diagrams of FIGS. 4 and 6 illustrate example processes performed by the document generator 130 and the document integrity processor 140 of the computing environment 110. It should be appreciated that the flow diagrams of FIGS. 4 and 6 provide merely one example of various functional arrangements and/or operations that may be employed to implement the document generator 130 and the document integrity processor 140, as described herein. In certain aspects, the flow diagrams of FIGS. 4 and 6 may be viewed as depicting an example of operations performed by the document generator 130 and the document integrity processor 140 according to one or more embodiments.

FIG. 4 is a flow diagram illustrating an example process 400 of fingerprint document generation performed by the document generator 130 of the computing environment 110 of FIG. 1 according to various embodiments of the present disclosure. According to the embodiment illustrated in FIG. 4, at reference 402 the document assembler 132 of the document generator 130 organizes content of a document into one or more paragraphs of one or more sections of the document. The content of the document may be provided to the document generator 130 from the client device 160, the third party environment 170, or one of the scanner and facsimile peripherals 180 and 182, for example. In some cases, the content of the document may be retrieved from the standard document/template directory 122, as directed by the client device 160 or the third party environment 170.

In one embodiment, content retrieved from the standard document/template directory 122 includes a template page including one or more term placeholders, and the document assembler 132 may insert names, dates, terms to be defined, or other text in place of the placeholders. In this context, FIG. 5 illustrates a template page of an example document 500, including term placeholders, relied upon by the document generator 130 of the computing environment 110 of FIG. 1 according to various embodiments of the present disclosure. As illustrated in FIG. 5 the document 500 includes paragraph 502, among other paragraphs, and a fingerprint 510 of the paragraph 502. The document 500 also includes term placeholders 522, 524, and 526.

In certain aspects, the term placeholders 522, 524, and 526 may be relied upon by the document assembler 132 to quickly insert terms to be defined within documents being generated. In various embodiments the term placeholders 522, 524, and 526 may be populated with static data or one or more dynamic data fields. For example, as illustrated in FIG. 5, when generating a document, the document assembler 132 may insert a date that the document was generated at the term placeholder 522. Further, the document assembler 132 may insert an assignor party name at the term placeholder 524 and insert an assignee party name at the term placeholder 526. The date, assignor party name, and assignee party name may be provided by a user of the client device 160 via the client interface 162, for example, or by another party or reference database.

As static data entries, date and party names, for example, may be populated in place of the term placeholders 522, 524, and 526, and remain static (e.g., unchanged) after generation of the document. Alternatively, one or more of the term placeholders 522, 524, and 526 may be populated as a dynamic data field. For example, a date inserted at the term placeholder 522 may comprise a dynamic date field that changes over time according to the current date. Similarly, the use of dynamic page number, time, or other dynamic fields is within the scope of the embodiments described herein.

It should be appreciated that the term placeholders illustrated in FIG. 5 are provided by way of example only, as other placeholders for various terms are within the scope and spirit of the embodiments described herein. Additionally, it is noted that, in various embodiments, term placeholders may be included within any paragraph of a document being generated by the document generator 130. It is also noted that, when generating a document based on a template including term placeholders, the fingerprint generator 134 may generate a fingerprint, such as the fingerprint 510, either before or after insertion of terms within the template in place of the term placeholders. When a dynamic data field is inserted in place of a term placeholder, the fingerprint generator 134 may generate a fingerprint either including or excluding the dynamic data field or the current data associated with the dynamic data field. Thus, in the context of a dynamic date field, for example, the fingerprint generator 134 may generate a fingerprint either including or excluding the dynamic date, in various embodiments.

Referring back to FIG. 4, after reference 402, the process 400 proceeds to reference 404, where the fingerprint generator 134 (FIG. 1) generates fingerprints for the document generated by the document assembler 132 at reference 402. For example, the fingerprint generator 134 may generate a fingerprint for one or more paragraphs and sections of the document. Additionally, the fingerprint generator 134 may generate a fingerprint for the document itself. With reference to the document 300 illustrated in FIG. 3 as an example, at reference 404, the fingerprint generator 134 may generate the fingerprints 326, 328, and 330 of the paragraphs 306, 308, and 310. Similarly, the fingerprint generator 134 may generate the fingerprints 322 and 324 of the sections 302 and 304 of the document 300. Additionally, the fingerprint generator 134 may generate the fingerprint 320 of the document 300. It is noted that, in certain aspects and embodiments, a fingerprint of a section of a document is determined from one or more fingerprints of paragraphs of the section. Alternatively, the fingerprint of the section may be determined directly from the content of the section. Likewise, a fingerprint of a document may be determined from fingerprints of sections or paragraphs of the document or determined directly from the content of the document itself.

After generating fingerprints at reference 404, the process 400 proceeds to reference 406, where the document assembler 132 generates one or more reference tags including a direct reference to one or more aspects (e.g., paragraphs, sections, etc.) of the document generated at reference 404. For example, the reference tag may include a direct reference to a common meaning statement stored in the common meaning statement directory 124 (FIG. 1), as described above. With reference to the example document 200 of FIG. 2, the reference tag 220 may be generated at reference 406 to easily reference a plain English description of the paragraph 204 of the document 200. In certain embodiments, the generation of reference tags at reference 406 may be omitted from the process 400.

After generating reference tags at reference 406, the process 400 proceeds to reference 408, where the document assembler 132 attaches or embeds the fingerprints (and any reference tags) to the document generated at reference 404. As discussed above, the fingerprints may be attached or embedded within the generated document at any location, so long as each fingerprint remains associated with its respective section or paragraph of content. Generally, reference tags may be attached or embedded within the generated document at a location proximate or adjacent to its associated section or paragraph of content, to indicate to a reader of the document that the reference tag is associated with certain content.

At reference 410 of the process 400, the document generator 130 provides the document, including the attached or embedded fingerprints or reference tags, to one or more computing devices or parties. For example, the document generator 130 may transmit the generated document to the client device 160 or the third party environment 170 via the network 150.

As further described below, the fingerprints of the document generated by the document generator 130 according to the process 400 may be used to quickly determine whether certain portions of the document have been amended or altered. Further, the reference tags of the document may be used to quickly identify common statement meanings for portions of the document, provided in plain English, for reference when reading the document.

FIG. 6 illustrates a flow diagram of an example process 600 of document integrity processing performed by the document integrity processor 140 of the computing environment 110 of FIG. 1 according to various embodiments of the present disclosure. At reference 602, the document integrity processor 140 receives a document for integrity processing. The document may be received from the client device 160 or the third party environment 170. As one example, a user of the client device 160 may wish to process the integrity of a document received from the third party environment 170. In this case, the user may transmit or forward the document from the client device 160 to the computing environment 110, for processing by the document integrity processor 140.

At reference 604 of the process 600, the integrity of the document received at reference 602 is checked by the document integrity processor 140. To this end, at reference 604, the fingerprint result generator 142 calculates a fingerprint or hash function with reference to the content of the document received at reference 602. For example, at reference 604, the fingerprint result generator 142 calculates a fingerprint function (such as a hash function) with reference to the entire content of the received document. In other words, the fingerprint result generator 142 applies a fingerprint function to the entire content of the received document. After calculating the fingerprint function, the fingerprint correlator 144 compares the result of the fingerprint function with a fingerprint attached or embedded within the document received at reference 602. Referring to the example document 300 of FIG. 3, as one example, to check the integrity of the document 300, a result of a fingerprint function applied to the document 300 may be compared to the fingerprint 320 of the document 300. Here, the fingerprint 320 of the document 300 may be considered a prior fingerprint of the document 300, and the result of the fingerprint function may be considered a current fingerprint of the document 300. If any changes were made to the content of the document 300, the result of the fingerprint function will differ from the fingerprint 320. On the other hand, if no changes were made to the content of the document 300, the result of the fingerprint function will not differ from the fingerprint 320.

Continuing to reference 606 of the process 600, the integrity of one or more sections of the document received at reference 602 is checked by the document integrity processor 140. To this end, at reference 606, the fingerprint result generator 142 calculates a fingerprint function with reference to the content of one or more sections of the document received at reference 602. In other words, the fingerprint result generator 142 applies a fingerprint function to the content of one or more sections of the document received at reference 602. After calculating a fingerprint function of each of the one or more sections of the document, the fingerprint correlator 144 compares the results of the fingerprint function with associated fingerprints attached or embedded within the document received at reference 602. Referring to the example document 300 of FIG. 3, to check the integrity of the section 302, a result of a fingerprint or hash function of the content of the section 302 may be compared to the fingerprint 322. In this context, the fingerprint 322 may be considered a prior fingerprint of the section 302, and the result of the fingerprint function applied to the section 302 may be considered a current fingerprint of the section 302. If any changes were made to the content of the section 302, the result of the fingerprint function will differ from the fingerprint 322. On the other hand, if no changes were made, the result the function will not differ from the fingerprint 322. In various embodiments, any number of the sections of the document received at reference 602 may be checked for alterations or amendments at reference 606.

It is noted that checking the integrity of document sections at reference 606 may be based, in part, upon the document integrity determined at reference 604. For example, in the case that the document received at reference 602 is determined at reference 604 to be free from any amendments or alterations, the processes at reference 606 may be omitted, because the integrity of the entire document was confirmed. In other words, if the document received at reference 602 is determined to be free from any amendments or alterations, each of the sections of the document should also be free from alterations, and the processes at reference 606 may be omitted to save time and processing costs. On the other hand, in case the document received at reference 602 is determined at reference 604 to include amendments or alterations, the processes at reference 606 may be relied upon to determine a certain section in which the alterations appear.

Continuing to reference 608 of the process 600, the integrity of one or more paragraphs of the document received at reference 602 is checked by the document integrity processor 140. To this end, at reference 608, the fingerprint result generator 142 calculates a fingerprint function with reference to the content of one or more paragraphs of the document received at reference 602. In other words, the fingerprint result generator 142 applies a fingerprint function to the content of one or more paragraphs of the document received at reference 602. After calculating a fingerprint function of each of the one or more paragraphs of the document, the fingerprint correlator 144 compares the result of the fingerprint functions to fingerprints attached or embedded within the document received at reference 602. Referring to the example document 300 of FIG. 3, to check the integrity of the paragraph 306, a result of a fingerprint function of the content of the paragraph 306 may be compared to the fingerprint 326. In this context, the fingerprint 326 may be considered a prior fingerprint of the document 300, and the result of the fingerprint function may be considered a current fingerprint of the paragraph 306 of the document 300. If any changes were made to the content of the paragraph 306, the result of the fingerprint function will differ from the fingerprint 326. On the other hand, if no changes were made, the result the function will not differ from the fingerprint 326. In various embodiments, any number of the paragraphs of the document received at reference 602 may be checked for alterations or amendments at reference 608.

Again, it is noted that checking the integrity of document paragraphs at reference 608 may be based, in part, upon the section integrity determined at reference 606. For example, in the case that a section of the document received at reference 602 is determined at reference 606 to be free from any amendments or alterations, the processes at reference 608 may be omitted for any paragraphs of the section, because the integrity of the entire section was confirmed. In other words, if the section is determined to be free from any amendments or alterations, each of the paragraphs of the section should also be free from alterations, and the processes at reference 608 may be omitted to save time and processing costs. On the other hand, in case the section is determined at reference 606 to include amendments or alterations, the processes at reference 608 may be relied upon to determine a certain paragraph among the section in which the alterations appear.

Based on the description above, it should be appreciated that a general location of alterations in a document may be identified, at least at document, section, and paragraph levels, by relying upon the iterative nature of checking integrity at references 604, 606, and 608. In various embodiments, one or more of the algorithms relied upon at references 604, 606, and 608 may include the ability to detect not only that an alteration has been identified in a document, section, or paragraph, for example, but also the nature and/or location of the change within the document, section, or paragraph. However, because the ability to identify the exact nature and/or location of changes generally requires reference fingerprints of larger size, a suitable checksum algorithm may be selected for use at references 604, 606, and 608 to balance the size of reference fingerprints with the ability to more accurately identify what and where alterations were made.

At reference 610 of the process 600, the standard document identifier 146 of the document integrity processor 140 identifies any standard form documents related to the document received at reference 602, among those stored in the standard document/template directory 122. In one embodiment, the identification of any standard form documents is performed by the standard document identifier 146 by referencing the standard document/template directory 122 with one or more fingerprints of the document received at reference 602. In exemplary embodiments, only fingerprints determined to be consistent with the content of the received document at one of references 604, 606, or 608 are relied upon by the standard document identifier 146 to identify related standard form documents.

As one example, if the content of a document received at reference 602 is determined at reference 604 to be consistent with the fingerprint of the document, the fingerprint of the document may be relied upon by the standard document identifier 146 to identify any standard forms related to the document. As further described below, the synopsis generator 148 may rely upon standard forms to provide a synopsis of the document received at reference 602. Even in a case in which the integrity of the document (e.g., in its entirety) received at reference 602 is not confirmed at reference 604, fingerprints of sections or paragraphs confirmed at either references 606 or 608, for example, may be relied upon to determine standard section or paragraph forms related to the document received at reference 602. These standard section or paragraph forms may also be determined by the standard document identifier 146 by referencing the standard document/template directory 122 the fingerprints of the document received at reference 602.

At reference 612 of the process 600, the standard document identifier 146 further identifies any common meaning statements for consistent sections or paragraphs of the document received at reference 602, among those stored in the common meaning statement directory 124. In one embodiment, the identification of any common meaning statement is performed by the standard document identifier 146 by referencing the common meaning statement directory 124 with one or more reference tags of the document received at reference 602. In some embodiments, only fingerprints determined to be consistent with the content of the received document at one of references 604, 606, or 608 are relied upon by the standard document identifier 146 to identify related common meaning statements.

As one example, if the content of a document received at reference 602 is determined at reference 604 to be consistent with the fingerprint of the document, the fingerprint of the document may be relied upon by the standard document identifier 146 to identify any common meaning statements related to the document. As further described below, the synopsis generator 148 may rely upon the common meaning statements, to provide a synopsis of the document received at reference 602. Even in a case in which the integrity of the document (e.g., in its entirety) received at reference 602 is not confirmed at reference 604, fingerprints of sections or paragraphs confirmed at either references 606 or 608, for example, may be relied upon to determine section or paragraph common meaning statements.

Proceeding to reference 614 of the process 600, the synopsis generator 148 provides a synopsis of the document received at reference 602, based on the integrity checks performed at references 604, 606, and 608, and any standard form documents and common meaning statements identified at references 610 and 612.

Figure 7:
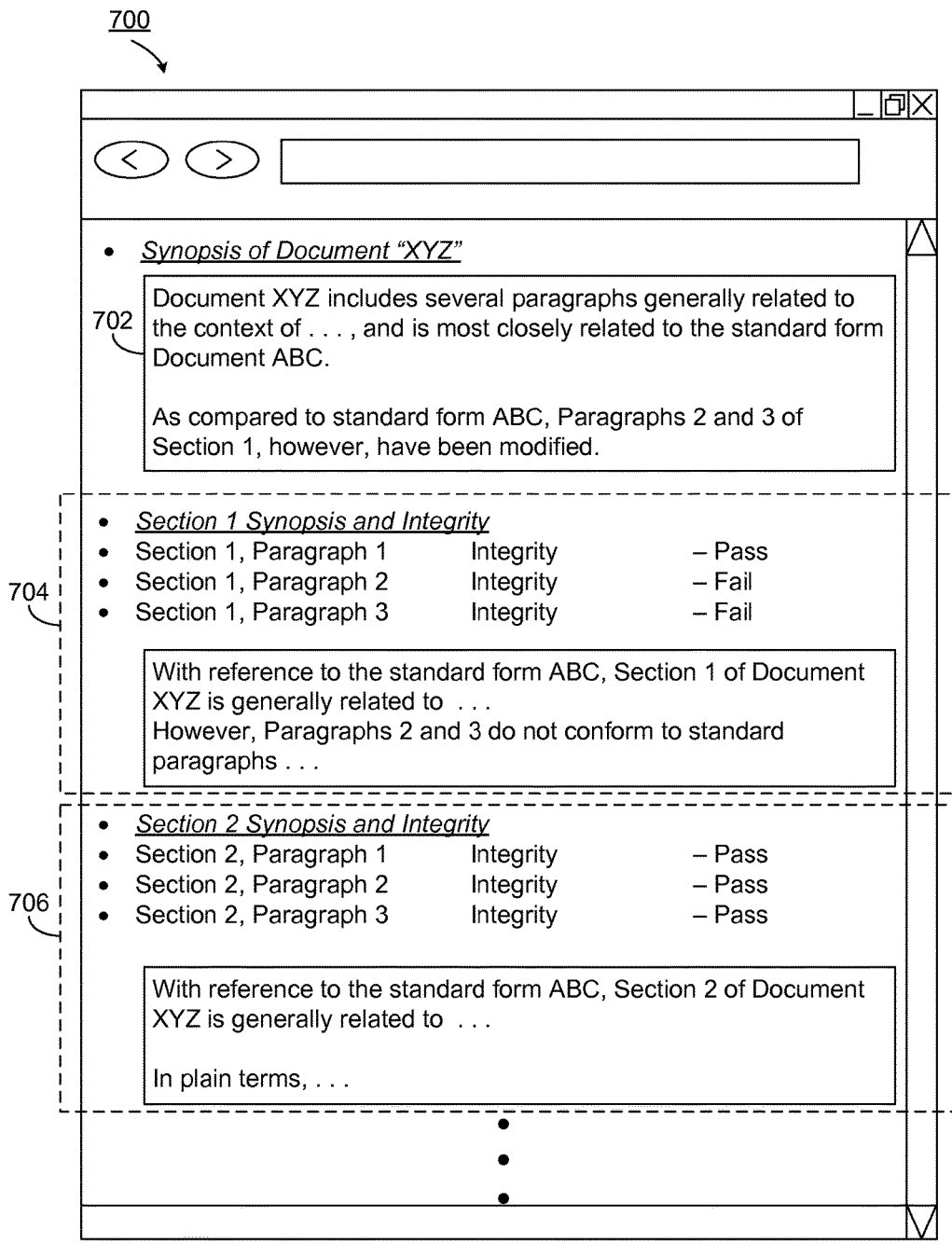
FIG. 7 illustrates an example synopsis of a document received by the computing environment of the networked environment of FIG. 1 according to various embodiments of the present disclosure.

In the context of reference 614 of FIG. 6, FIG. 7 illustrates an example synopsis 700 of a document received by the document integrity processor 140 of the computing environment 110 of FIG. 1 according to various embodiments of the present disclosure. In the example of FIG. 7, a synopsis 700 is illustrated for an example document "XYZ" received at reference 602 of FIG. 6. As part of the synopsis of the document "XYZ", an overall synopsis 702 indicates that the document XYZ includes several paragraphs generally related to a certain context or field of use or business (e.g., certain business forms, sales forms, types of licenses, contracts, lease agreements, etc., without limitation). The synopsis 702 identifies that the standard form document "ABC" is a standard form related to the document "XYZ." For example, even if the fingerprint of the document "XYZ" may not be identical to the fingerprint of the document "ABC", if a substantial number of the paragraphs of the documents "XYZ" and "ABC" are found to correlate with each other, the synopsis generator 148 may identify them as being related.

The synopsis 702 identifies, however, that the document "XYZ" differs from the standard form document "ABC" at certain paragraphs and sections, where the document "XYZ" has been modified, amended, or altered. Among embodiments, the overall synopsis 702 may include one or more common meaning statements directed to one or more plain English explanations of the overall substance of the document.

In addition to the overall synopsis 702, the synopsis 700 further includes a synopsis 704 of a first section of the document received at reference 602 of FIG. 6. In the synopsis 704 of the first section, an indication of the integrity of each of the paragraphs in the first section is provided. Particularly, the context of paragraph 1 of the first section is identified in the synopsis 704 as being consistent with the content of that paragraph, while paragraphs 2 and 3 of the first section are identified as being modified, amended, or altered. As described above, amendments or alterations to certain sections or paragraphs may be identified by the document integrity processor 140 based on a comparison of fingerprints of the document with a result of a fingerprint function applied to the content of the document.

In the synopsis 704, a general description of the first section of the document is provided, with reference to the standard form document "ABC". It is also noted in the synopsis 704, however, that paragraphs 2 and 3 do not conform to any known standard paragraphs of the document "ABC," due to a mismatch between a result of a fingerprint function applied to content of those paragraphs and the prior fingerprints associated with those paragraphs, for example. Thus, if any common meaning statements associated with the first section are provided as part of the synopsis 704, they may not be provided for paragraphs 2 and 3, because those paragraphs are identified as being altered.

In certain aspects, although paragraphs 2 and 3 of section 1 do not conform to any known standard paragraphs of the document "ABC," the synopsis generator 148 may be able to identify or suggest a "most-likely" standard form of paragraphs 2 and 3, with reference to the document "ABC" or other standard form documents in the standard document directory 122. Such an identification or suggestion of a "most-likely" standard paragraph may be based on, for example, relative locations of other paragraphs in the document "XYZ" that correlate with the standard form document "ABC." In certain embodiments, the synopsis 700 may display one or more most-likely standard paragraphs and offer the ability to replace paragraphs of the document "XYZ" with the most-likely standard paragraphs.

As further illustrated, the synopsis 700 further includes a synopsis 706 of a second section of the document received at reference 602 of FIG. 6. In the synopsis 706 of the second section, an indication of the integrity of each of the paragraphs is also provided. Particularly, each of the paragraphs in the second section is identified as being consistent with its content. In the synopsis 706, a general description of the second section of the document is provided, with reference to the standard form document "ABC" as an example. Further, in the synopsis 706, one or more common meaning statements may be provided, if available in the common meaning statement directory 124 (FIG. 1), because the paragraphs are identified as being consistent with their content.

In connection with FIG. 7, it should be appreciated that the synopsis 700 may be provided, at least in part, without checking the integrity of a document. For example, one or more common meaning statements may be identified as part of a synopsis for a document using reference tags, without checking the integrity of the document. In this case, the synopsis 700 may not provide details on whether the document was altered. Alternatively or additionally, a synopsis of a document may be provided even if only the integrity of certain sections or paragraphs of the document have been checked.

It is noted that the synopsis 700 is provided by way of example only. That is, other arrangements or presentations for a synopsis of a received document are within the scope and spirit of the embodiments described herein. Additionally, it is noted that the synopsis 700 may include additional statements related to the integrity of a document, as described or suggested herein, or omit certain features of the analysis illustrated in FIG. 7. For example, the synopsis 700 may include various statements regarding one or more reference tags included within a received document. In one embodiment, the synopsis 700 may be presented at the client interface 162 of the client device 160 (FIG. 1). In other embodiments, the synopsis 700 may be presented at any other suitable interface of any computing device.

As described herein, documents including fingerprints may be relied upon to determine the integrity of a document quickly and easily. Further, certain aspects of the document may be analyzed and presented to a reader of the document. To facilitate a clear understanding of the document, various statements related to the terms and conditions of a document, for example, may be provided in a synopsis form that is relatively simple to comprehend.

Figure 8:
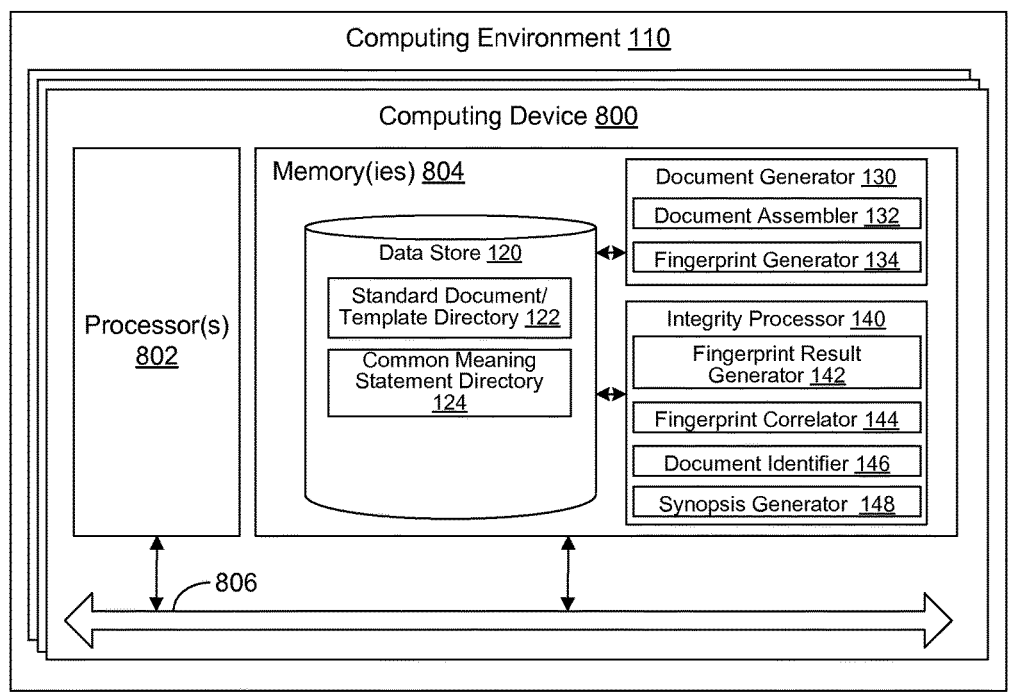
FIG. 8 is a schematic block diagram of the computing environment employed in the networked environment of FIG. 1 according to various embodiments of the present disclosure.

FIG. 8 illustrates an example schematic block diagram of the computing environment 110 employed in the networked environment 100 of FIG. 1 according to various embodiments of the present disclosure. The provider computing environment 110 includes one or more computing devices 800. Each computing device 800 includes at least one processing system, for example, having a processor 802 and a memory 804, both of which are electrically and communicatively coupled to a local interface 806. To this end, each computing device 800 may include, for example, at least one server computer or similar device. The local interface 806 may include, for example, a data bus with an accompanying address/control bus or other bus structure as can be appreciated.

In various embodiments, the memory 804 stores data and software or executable-code components executable by the processor 802. For example, the memory 804 may store executable-code components associated the document generator 130, the document integrity processor 140, and the logical elements thereof, for execution by the processor 802. The memory 804 may also store data such as that stored in the data store 120, among other data.

It should be understood and appreciated that the memory 804 may store other executable-code components for execution by the processor 802. For example, an operating system may be stored in the memory 804 for execution by the processor 802. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

As discussed above, in various embodiments, the memory 804 stores software for execution by the processor 802. In this respect, the terms "executable" or "for execution" refer to software forms that can ultimately be run or executed by the processor 802, whether in source, object, machine, or other form. Examples of executable programs include, for example, a compiled program that can be translated into a machine code format and loaded into a random access portion of the memory 804 and executed by the processor 802, source code that can be expressed in an object code format and loaded into a random access portion of the memory 804 and executed by the processor 802, or source code that can be interpreted by another executable program to generate instructions in a random access portion of the memory 804 and executed by the processor 802, etc. An executable program may be stored in any portion or component of the memory 804 including, for example, a random access memory (RAM), read-only memory (ROM), magnetic or other hard disk drive, solid-state, semiconductor, or similar drive, USB flash drive, memory card, optical disc (e.g., compact disc (CD) or digital versatile disc (DVD)), floppy disk, magnetic tape, or other memory component.

In various embodiments, the memory 804 may include both volatile and nonvolatile memory and data storage components. Volatile components are those that do not retain data values upon loss of power. Nonvolatile components are those that retain data upon a loss of power. Thus, the memory 804 may include, for example, a random access memory (RAM), read-only memory (ROM), magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM may include, for example, a static random access memory (SRAM), dynamic random access memory (DRAM), or magnetic random access memory (MRAM), and/or other similar memory device. The ROM may include, for example, a programmable read-only memory (PROM), erasable programmable read-only memory (EPROM), electrically erasable programmable read-only memory (EEPROM), or other similar memory device.

Also, the processor 802 may represent multiple processors 802 and/or multiple processor cores and the memory 804 may represent multiple memories that operate in parallel, respectively, or in combination. Thus, the local interface 806 may be an appropriate network or bus that facilitates communication between any two of the multiple processors 802, between any processor 802 and any of the memories 804, or between any two of the memories 804, etc. The local interface 806 may include additional systems designed to coordinate this communication, including, for example, a load balancer that performs load balancing. The processor 802 may be of electrical or of some other available construction.

As discussed above, the document generator 130, the document integrity processor 140, and the logical elements thereof may be embodied, in part, by software or executable-code components for execution by general purpose hardware. Alternatively the same may be embodied in dedicated hardware or a combination of software, general, specific, and/or dedicated purpose hardware. If embodied in such hardware, each can be implemented as a circuit or state machine, for example, that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts or process diagrams of FIGS. 4 and 6 are representative of certain processes, functionality, and operations of embodiments discussed herein. Each block may represent one or a combination of steps or executions in a process. Alternatively or additionally, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as the processor 802. The machine code may be converted from the source code, etc. Further, each block may represent, or be connected with, a circuit or a number of interconnected circuits to implement a certain logical function or process step.

Although the flowcharts or process diagrams of FIGS. 4 and 6 illustrate a specific order, it is understood that the order may differ from that which is depicted. For example, an order of execution of two or more blocks may be scrambled relative to the order shown. Also, two or more blocks shown in succession in FIGS. 4 and 6 may be executed concurrently or with partial concurrence. Further, in some embodiments, one or more of the blocks shown in FIGS. 4 and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the document generator 130, the document integrity processor 140, and the logical elements thereof that include software or executable-code components, can be embodied or stored in any tangible or non-transitory computer-readable medium or device for execution by an instruction execution system such as a general purpose processor. In this sense, the logic may include, for example, software or executable-code components that can be fetched from the computer-readable medium and executed by the instruction execution system. Thus, the instruction execution system may be directed by execution of the instructions to perform certain processes such as those illustrated in FIGS. 4 and 6. In the context of the present disclosure, a "computer-readable medium" can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium may include a random access memory (RAM) including, for example, a static random access memory (SRAM), dynamic random access memory (DRAM), or magnetic random access memory (MRAM). In addition, the computer-readable medium may include a read-only memory (ROM), a programmable read-only memory (PROM), an erasable programmable read-only memory (EPROM), an electrically erasable programmable read-only memory (EEPROM), or other similar memory device.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. A non-transitory computer-readable medium embodying a program that, when executed by at least one computing device, directs the at least one computing device to perform a method comprising:

applying, by the at least one computing device, a fingerprint function to a document, the document comprising a plurality of paragraphs, a first prior fingerprint of the document, and a second prior fingerprint of at least one paragraph among the plurality of paragraphs;

determining, by the at least one computing device, a first integrity of the document by comparing a result of the fingerprint function applied to the document with the first prior fingerprint;

determining, by the at least one computing device, a second integrity of the at least one paragraph by comparing a result of the fingerprint function applied to the at least one paragraph with the second prior fingerprint;

in response to the result of the fingerprint function applied to the at least one paragraph being consistent with the second prior fingerprint, identifying, by the at least one computing device, a standard document related to the document based at least in part on the second prior fingerprint;

identifying, by the at least one computing device, at least one other paragraph among the plurality of paragraphs that varies from the standard document; and providing, by the at least one computing device, a synopsis of the document that indicates that the document is related to the standard document but that the at least one other paragraph differs from the standard document.

2. The non-transitory computer-readable medium of claim 1, wherein the synopsis includes a common meaning statement for the at least one paragraph, and wherein the common meaning statement is identified by referencing a data store of common meaning statements.

3. The non-transitory computer-readable medium of claim 1, wherein the document further comprises a reference tag, and the method further comprises identifying, by the at least one computing device, the standard document based further on a comparison of the reference tag to a data store of standard documents.

4. A system comprising:
   at least one data store configured to store a document; and
   at least one computing device in communication with the at least one data store, the at least one computing device configured to at least:
      apply a fingerprint function to the document to generate a first current fingerprint of the document and a second current fingerprint of a section of the document;
      determine a first integrity of the document by comparing a first prior fingerprint of the document with the first current fingerprint;
      determine a second integrity of the section of the document by comparing a second prior fingerprint of the section of the document with the second current fingerprint;
      in response to the second prior fingerprint being consistent with the second current fingerprint, identify a standard document related to the document based at least in part on the second prior fingerprint; and
      provide a synopsis of the document that indicates that the document is related to the standard document based at least in part on at least one of the first integrity or the second integrity.

5. The system of claim 4, wherein the computing device is further configured to identify the standard document based further on a comparison of the first prior fingerprint to a data store of standard documents.

6. The system of claim 5, wherein the computing device is further configured to provide the synopsis with reference to the standard document.

7. The system of claim 4, wherein:
   the section of the document comprises a plurality of paragraphs; and
   the computing device is further configured to:
      apply the fingerprint function to at least one paragraph among the plurality of paragraphs to generate at least one third current fingerprint of the at least one paragraph; and
      determine a third integrity of the at least one paragraph by comparing a third prior fingerprint of the at least one paragraph with the third current fingerprint.

8. The system of claim 4, wherein the computing device is further configured to indicate that the first current fingerprint is inconsistent with the first prior fingerprint based on the first integrity.

9. The system of claim 4, wherein the computing device is further configured to:
   identify a common meaning statement for the section of the document by referencing a data store of common meaning statements; and
   include the common meaning statement for the section in the synopsis of the document.

10. The system of claim 4, wherein the computing device is further configured to identify a common meaning statement for the section of the document based at least in part on a direct reference to the common meaning statement for the section of the document in a data store of common meaning statements.

11. A computer-implemented method comprising:
   applying, by at least one computing device, a fingerprint function to a document;
   determining, by the at least one computing device, a first integrity of the document by comparing a result of the fingerprint function with a first prior fingerprint of the document;
   determining, by the at least one computing device, a second integrity of a section of the document by comparing the result of the fingerprint function with a second prior fingerprint of the section of the document;
   in response to the result of the fingerprint function applied to the section of the document being consistent with the second prior fingerprint, identifying, by the at least one computing device, a standard document related to the document based at least in part on the second prior fingerprint; and
   providing, by the at least one computing device, a synopsis of the document with reference to the standard document.

12. The computer-implemented method of claim 11, wherein the synopsis indicates that the document is related to the standard document based at least in part on at least one of the first integrity or the second integrity.

13. The computer-implemented method of claim 11, wherein:
   the document comprises a plurality of paragraphs; and
   the method further comprises identifying, by the at least one computing device, at least one paragraph among the plurality of paragraphs that varies from the standard document according to a comparison of a result of the fingerprint function applied to the at least one paragraph with a third prior fingerprint of the at least one paragraph.

14. The computer-implemented method of claim 11, wherein the synopsis indicates that at least a portion of the document is inconsistent with the first prior fingerprint in response to the first prior fingerprint being inconsistent with the result of the fingerprint function.

15. The computer-implemented method of claim 11, wherein the second integrity is determined in response to the first prior fingerprint being inconsistent with the result of the fingerprint function.

16. The computer-implemented method of claim 15, further comprising:
identifying, by the at least one computing device, a common meaning statement for the section of the document by referencing a data store of common meaning statements in response to the second prior fingerprint being consistent with the result of the fingerprint function, wherein
providing the synopsis further comprises providing the common meaning statement for the section of the document.

17. The computer-implemented method of claim 16, wherein referencing the data store of common meaning statements further comprises referencing, by the at least one computing device, the data store of common meaning statements based on the second prior fingerprint.

18. The computer-implemented method of claim 11, further comprising:
in response to the result of the fingerprint function applied to the section of the document being inconsistent with the second prior fingerprint, determining, by the at least one computing device, a third integrity of at least one paragraph among a plurality of paragraphs of the section of the document by comparing a result of a fingerprint function applied to the at least one paragraph with a third prior fingerprint of the at least one paragraph.

19. The computer-implemented method of claim 18, further comprising identifying, by the at least one computing device, a common meaning statement for the at least one paragraph with reference to a data store of common meaning statements in response to the result of the fingerprint function applied to the at least one paragraph being consistent with the third prior fingerprint.

20. The computer-implemented method of claim 11, wherein the document further comprises a reference tag, and the method further comprises identifying, by the at least one computing device, the standard document based at least in part on a comparison of the reference tag of the document to a data store of standard documents.

21. A computer-implemented method, comprising:
applying, by at least one computing device, a fingerprint function to a document;
determining, by the at least one computing device, a first integrity of the document by comparing a result of the fingerprint function with a first prior fingerprint of the document;
determining, by the at least one computing device, a second integrity of at least one paragraph among a plurality of paragraphs in the document by comparing a result of the fingerprint function with a second prior fingerprint of the at least one paragraph;
in response to the result of the fingerprint function being consistent with the second prior fingerprint, identifying, by the at least one computing device, a standard document related to the document based at least in part on the second prior fingerprint; and
providing, by the at least one computing device, a synopsis of the document with reference to the standard document.

22. The computer-implemented method of claim 21, further comprising:
determining, by the at least one computing device, a third integrity of a section of the document by comparing a result of the fingerprint function with a third prior fingerprint of the section of the document; and
identifying, by the at least one computing device, that the section varies from the standard document based at least in part on the third integrity.

23. The computer-implemented method of claim 22, wherein the synopsis includes a common meaning statement for at least one of the document or the section of the document.

24. The computer-implemented method of claim 21, wherein the document further comprises a reference tag, and the method further comprises identifying, by the at least one computing device, the standard document based further on a comparison of the reference tag to a data store of standard documents.

* * * * *